United States Patent
Yu

(10) Patent No.: US 6,540,557 B1
(45) Date of Patent: Apr. 1, 2003

(54) ELECTRICAL CARD CONNECTOR WITH ENHANCED EMI PROTECTION

(75) Inventor: Hung-Chi Yu, Hsi-Chih (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/025,659

(22) Filed: Dec. 18, 2001

(51) Int. Cl.[7] .............................................. H01R 13/648
(52) U.S. Cl. ...................................................... 439/607
(58) Field of Search ............................ 439/607, 541.5, 439/154, 160, 604, 608, 610

(56) References Cited

U.S. PATENT DOCUMENTS 6,102,708 A * 8/2000 Kimura ........................ 439/64
6,146,193 A * 11/2000 Yu ............................ 439/541.5

* cited by examiner

Primary Examiner—Tho D. Ta
Assistant Examiner—Ross Gushi
(74) Attorney, Agent, or Firm—Wei Te Chung

(57) ABSTRACT

An electrical card connector comprises an insulative housing (50) having an upper surface (5021) and an opposite lower surface (5022), a plurality of terminals (51) received in the insulative housing, a top shield (52) attached to the upper surface of the insulative housing and including a body plate (526) and a pair of sidewalls (528) downwardly extending from the body plate, a grounding plate (53) attached to the lower surface of the insulative housing, and a bottom shield (54) having a front end engaged with the grounding plate and an opposite rear end engaged with the sidewalls of the top shield, whereby the top shield and the bottom shield together define a receiving cavity for receiving an electrical card.

9 Claims, 5 Drawing Sheets

ELECTRICAL CARD CONNECTOR WITH ENHANCED EMI PROTECTION

BACKGROUND OF THE INVENTION

1. Field of the Invention

The present invention relates to an electrical card connector, and particularly to an electrical card connector having an additional bottom shield for enhanced EMI protection.

2. Description of Related Art

Notebook computers are widely used due to small volume and convenience for carrying. The limited space inside a notebook computer accommodates many devices and components, so the notebook computer encounters the Electro Magnetic Interference (EMI) problem. Electrical card connectors are widely used in notebook computers. When such connectors are used in high speed data transmission applications, the amount of electromagnetic or radio frequency interference increases. A conventional electrical card connector uses a single top shield covering an upper surface of a housing thereof for reducing the interference, but shielding of the bottom of the connector is ignored. Thus, such connector can not achieve complete and reliable EMI shielding. Therefore, it is necessary to provide an electrical card connector with a top shield and a bottom shield defining a shielded cavity for enhanced EMI protection.

Therefore, an electrical card connector with an additional bottom shield is required to overcome the disadvantages of the prior art.

SUMMARY OF THE INVENTION

Accordingly, the object of the present invention is to provide an electrical card connector having an additional bottom shield for enhanced EMI protection.

In order to achieve the object set forth, an electrical card connector comprises an insulative housing having an upper surface and an opposite lower surface, a plurality of terminals received in the insulative housing, a top shield attached to the upper surface of the insulative housing comprising a body plate and a pair of sidewalls downwardly extending from the body plate, a grounding plate attached to the lower surface of the insulative housing, and a bottom shield having a front end engaged with the grounding plate and an opposite rear end engaged with the sidewalls of the top shield, whereby the top shield and the bottom shield together define a receiving cavity for receiving an electrical card.

Other objects, advantages and novel features of the invention will become more apparent from the following detailed description when taken in conjunction with the accompanying drawings.

DETAILED DESCRIPTION OF THE INVENTION

Figure 1:
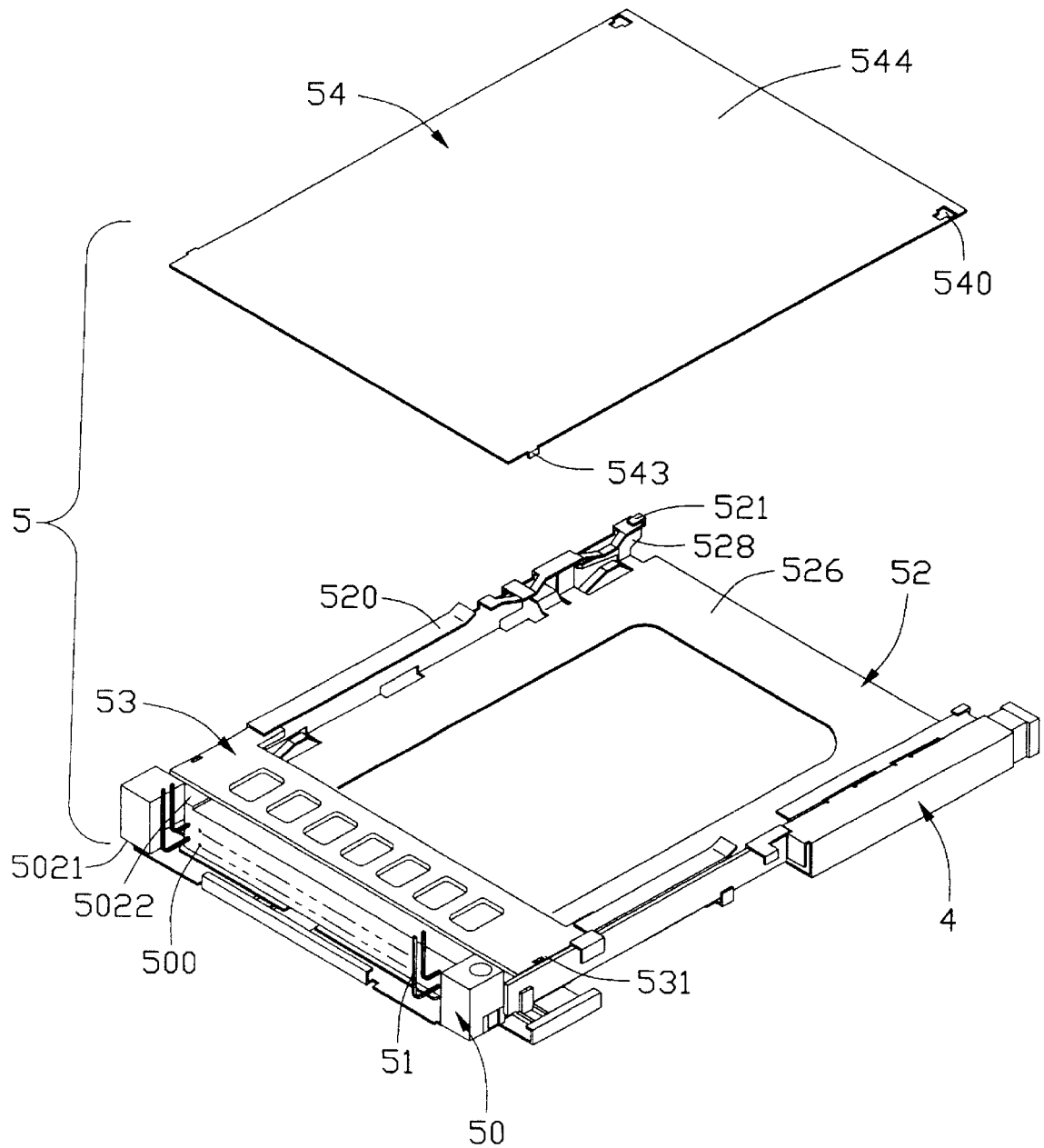
FIG. 1 is a perspective view of an electrical card connector in accordance with a first embodiment of the present invention, with a bottom shield thereof exploded.

Reference will now be made to the drawing figures to describe the present invention in detail.

Referring to FIG. 1, an electrical card connector 5 in accordance with a first embodiment of the present invention comprises an insulative housing 50, a plurality of terminals 51, a top shield 52, a grounding plate 53 and a bottom shield 54.

The insulative housing 50 comprises a plurality of receiving passageways 500 for receiving corresponding terminals 51. The top shield 52 is attached to an upper surface 5021 of the insulative housing 50 and comprises a pair of sidewalls 528 each having a side flange 520. An ejector mechanism 4 is assembled to one of the sidewalls 528 of the top shield 52. The grounding plate 53 is assembled between a lower surface 5022 of the insulative housing 50 and the bottom shield 54 for grounding.

Figure 3:
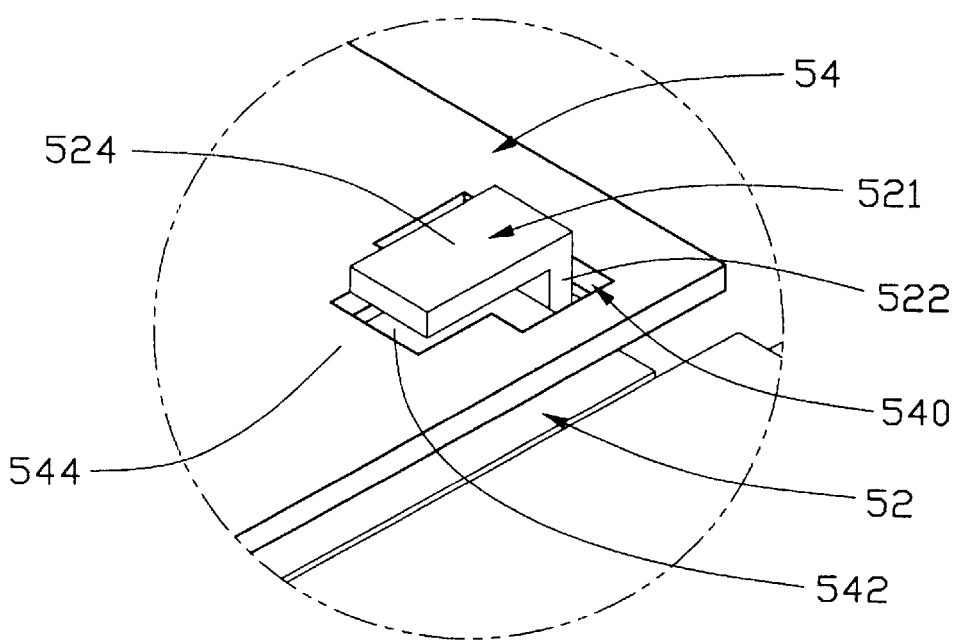
FIG. 3 and FIG. 4 are partial, enlarged views sequentially illustrating the engagement between a retention tab of a top shield and a cutout of the bottom
Figure 4:
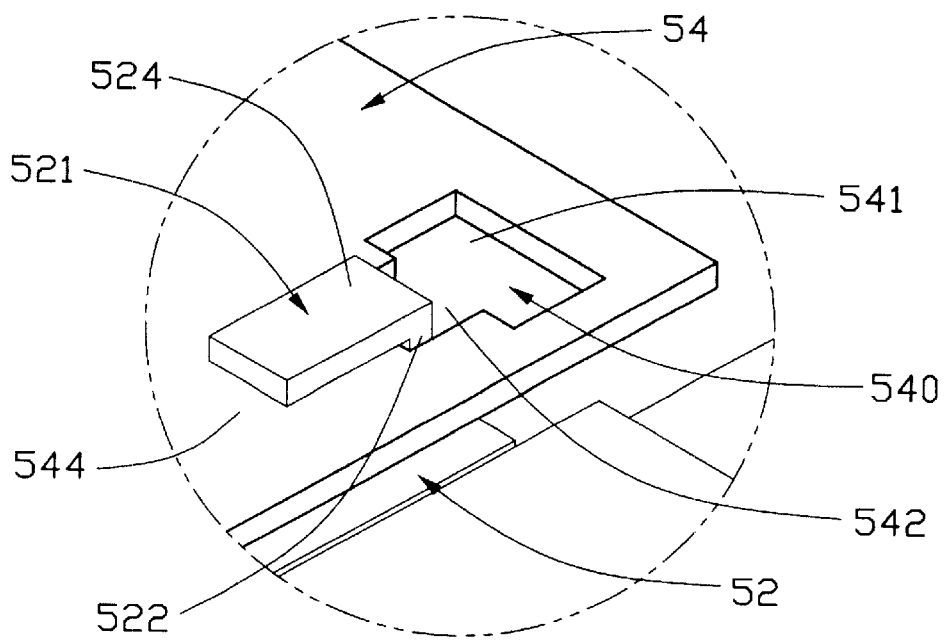

The top shield 52 is a metal frame and has a body plate 526. The pair of sidewalls 528 extend downwardly from opposite transverse edges of the body plate 526 and each has a retention tab 521 stamped from a rear end of the side flange 520 thereof. As is shown in FIGS. 3 and 4, the retention tab 521 has a vertical portion 522 and a horizontal portion 524 extending horizontally from a lower end of the vertical portion 522. The vertical portion 522 integrally extends downwardly from the side flange 520.

The bottom shield 54 is a rectangular metal plate and has a flat surface 544. A pair of cutouts 540 is defined in a rear end of the bottom shield 54. As is clearly shown in FIGS. 3 and 4, the cutout 540 is like a character "T" in shape, and includes a first slot 541 and a second slot 542 communicating with the first slot 541. The width of the first slot 541 is larger than that of the second slot 542. A pair of upwardly extending tabs 543 is integrally stamped from the opposed side edges of the bottom shield 54 at a front end thereof.

The grounding plate 53 is a metal plate for grounding. A pair of slits 531 is defined in opposed ends of the grounding plate 53 for receiving the corresponding tabs 543 of the bottom shield 54.

Figure 2:
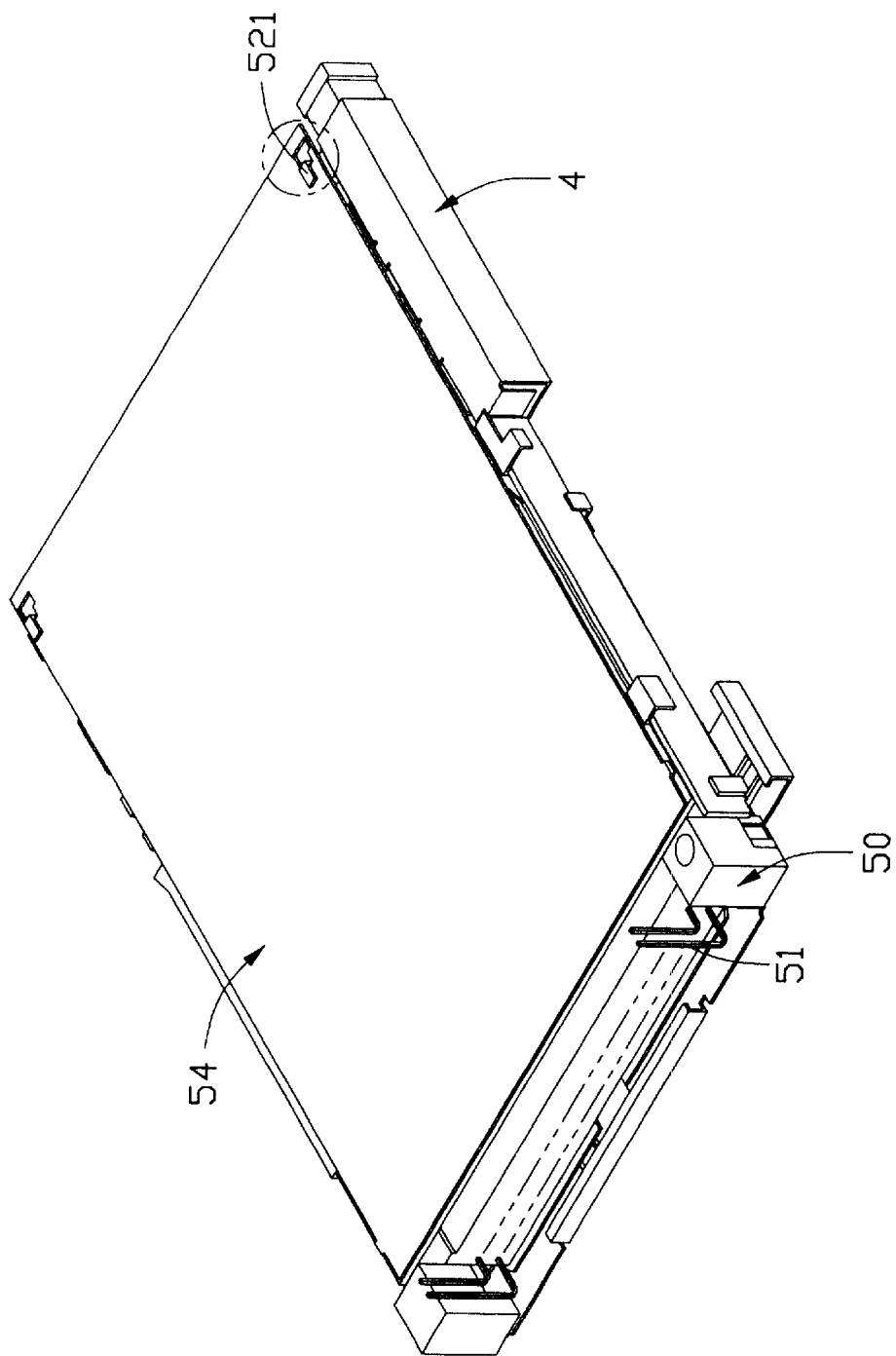
FIG. 2 is a perspective view of the electrical card connector with the bottom shield mounted thereon.

In assembly, referring to FIGS. 2, 3 and 4, the retention tabs 521 of the top shield 52 are first aligned with and extend through the cutouts 540 of the bottom shield 54. The bottom shield 54 is then moved in a front-to-rear direction, until the tabs 543 are aligned with and inserted into the corresponding slits 531 of the grounding plate 53. Meanwhile, each retention tab 521 is moved into the corresponding second slot 542, whereby the horizontal portion 524 presses against the flat surface 544 of the bottom shield 54, and the vertical portion 522 abuts against a front edge of the second slot 542. Therefore, the bottom shield 54 is firmly assembled to the connector. The bottom shield 54 and the top shield 52 together define a shielded cavity to achieve EMI protection for an inserted electrical card.

Figure 5:
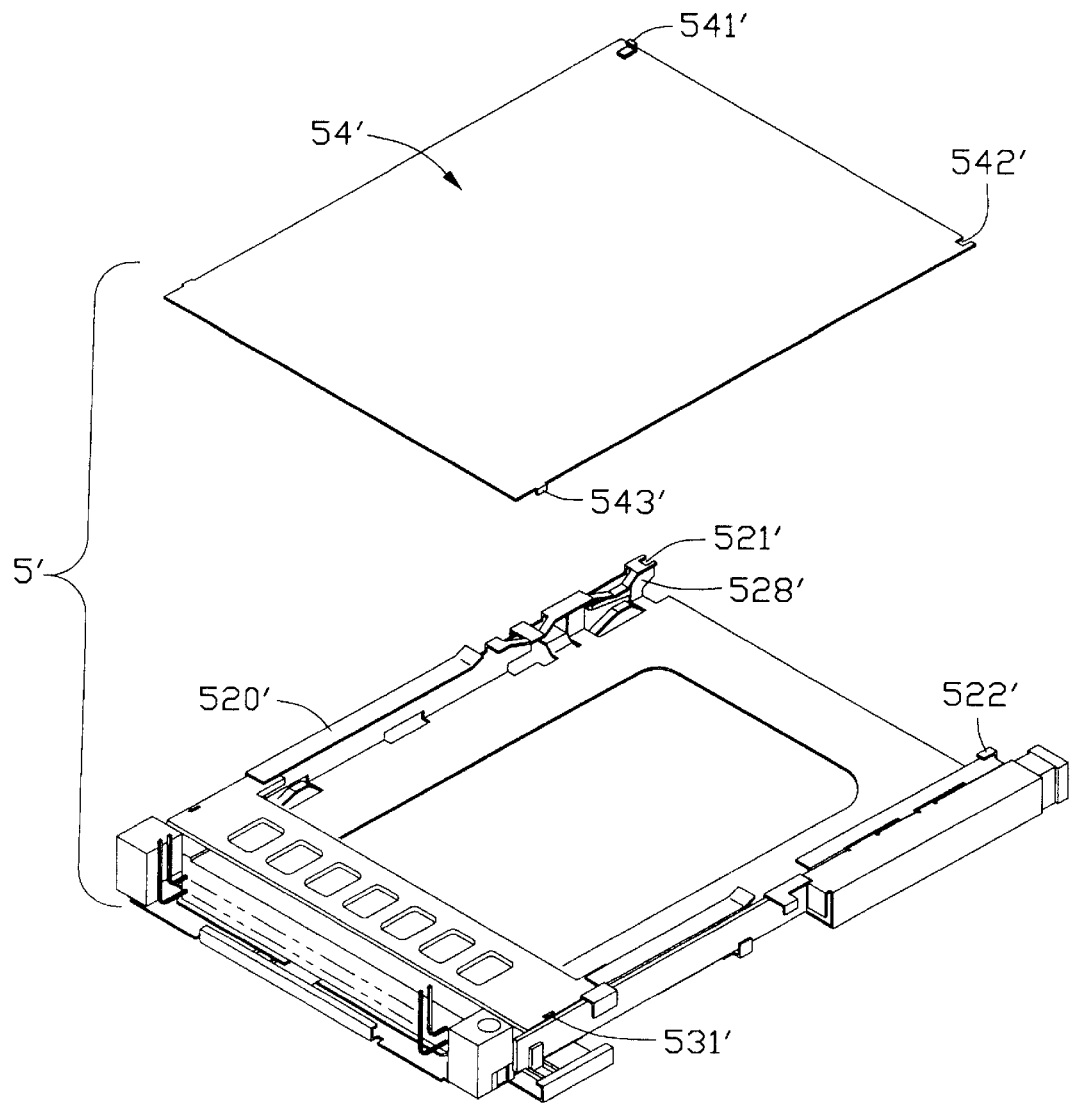
FIG. 5 is an exploded, perspective view of an electrical card connector in accordance with another embodiment of the present invention.
Figure 6:
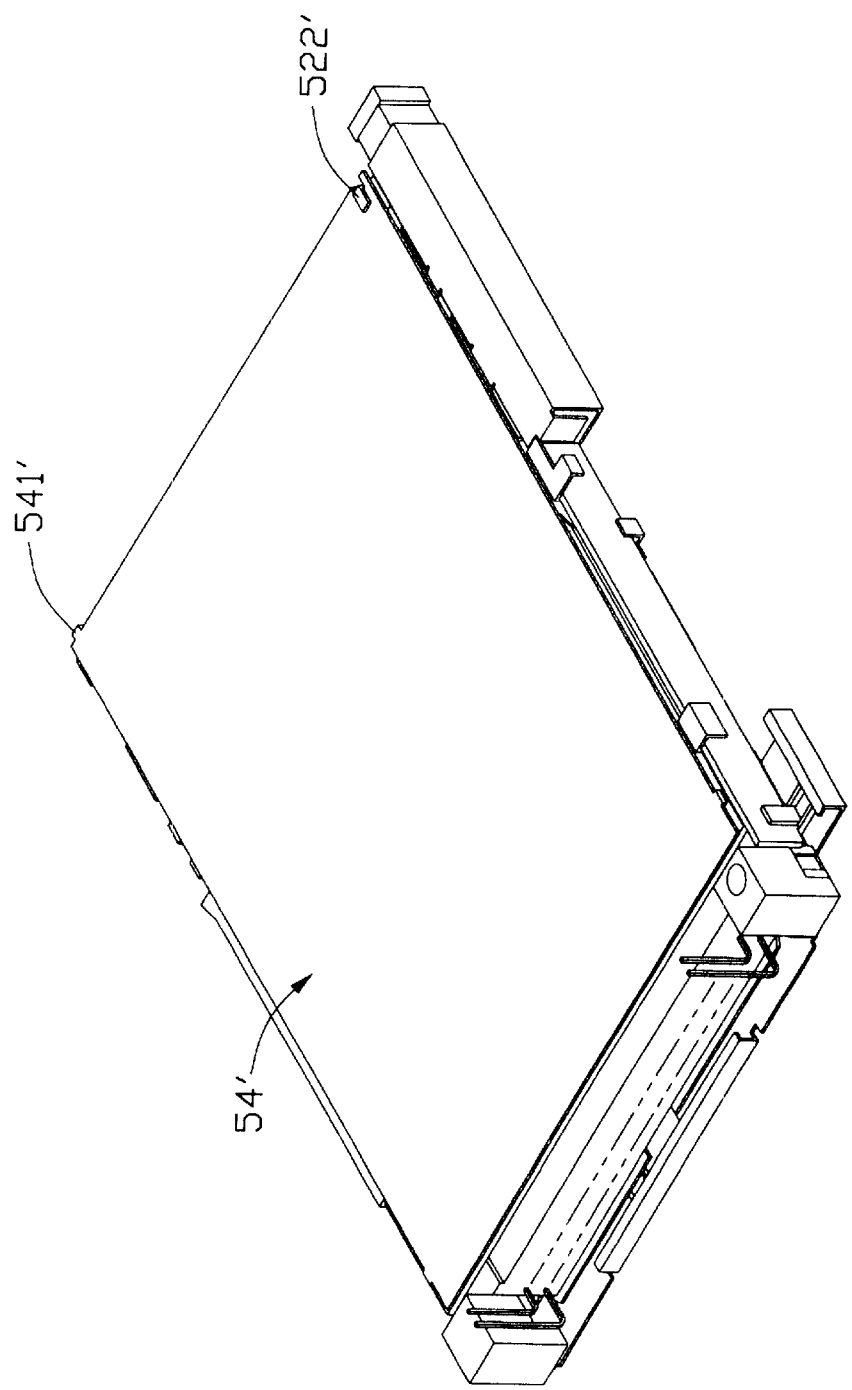
FIG. 6 is an assembled view of FIG. 5.

FIGS. 5 and 6 illustrate an electrical card connector 5' of another embodiment of the present invention. In this embodiment, the connector 5' has a similar structure to the first embodiment. The bottom shield 54' comprises a retention tab 541' extending upwardly from a rear edge thereof, and a cutout 542' defined in the rear edge opposite to the retention tab 541'. In order to engage with the retention tab 541' and the cutout 542', corresponding slot 521' and retention tab 522' are provided on side flanges 520' of respective sidewalls 528' of the top shield 52'. Thus, the bottom shield 54' and the top shield 52' together define a receiving cavity for accommodating an electrical card. In assembly, one retention tab 522' of the top shield 52' is first aligned with and extends through the corresponding cutout 542' of the bottom shield 54' to confront the bottom shield 54' so that one side of the bottom shield 54' is fixed, and another side of the bottom shield 54' is deflected/tilted at a degree from a horizontal position with that retention tab 522' being engaged within the cutout 542'. Then in generally a rear-to-front direction with slightly rotation about the engaged retention tab 522'*a* and the cutout 542', another side of the bottom shield 54' is horizontally moved while keeping engagement between that retention tab 522' and the cutout 542', until the retention tab 541' is received in the slot 521'. Finally the tab 543' inserts into the slit 531'. Therefore, the bottom shield 54' is firmly assembled to the connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector for receiving an electrical card, comprising:
    an insulative housing having an upper surface and an opposite lower surface;
    a plurality of terminals received in the insulative housing;
    a top shield attached to the upper surface of the insulative housing, the top shield comprising a body plate and a pair of sidewalls downwardly extending from the body plate, one of the sidewalls forming a retention tab, the retention tab including a vertical portion and a horizontal portion extending from a lower end of the vertical portion; and
    a bottom shield having a front end attaching to the housing and an opposite rear end engaged with the sidewalls of the top shield, the bottom shield defining a cutout in accordance with the retention tab and for the horizontal portion of the retention tab passing through; wherein the top shield and the bottom shield together define a receiving cavity for receiving an electrical card.

2. The electrical card connector as described in claim 1, wherein the grounding plate has a pair of slits at opposite ends thereof, and the bottom shield has a pair of tabs integrally stamped from opposite side edges at the front end thereof for engaging with said slits.

3. The electrical card connector as described in claim 1 further comprising a grounding plate attached to the lower surface of the insulative housing and the bottom shield engaging with the grounding plate.

4. The electrical card connector as described in claim 1, wherein the cutout includes a first slot and a narrower second slot communicating with the first slot.

5. The electrical card connector as described in claim 1, wherein the rear end of the bottom shield defines a cutout, and one of the sidewalls of the top shield has a retention tab at a rear end thereof for engaging with the cutout.

6. The electrical card connector as described in claim 5, wherein the cutout includes a first slot and a second slot communicated with the first slot, the width of the first slot being larger than that of the second slot.

7. The electrical card connector as described in claim 6, wherein the retention tab has a vertical portion and a horizontal portion extending from a lower end of the vertical portion.

8. An electrical card connector comprising:
    an insulative housing defining opposite upper and lower surfaces thereon;
    a plurality of terminals disposed in the housing;
    a grounding plate attached to one of said upper and bottom surfaces of the housing;
    a shield attached to the other of said upper and bottom surfaces of the housing; wherein
        said shield and grounding plate define a tab vs. cutout structure around a rear portion of the connector, which allows the shield to be initially generally vertically assembled to the grounding plate under a condition that the tab is aligned with and further extends through in the cutout, so as to form an initial engagement between the shield and the grounding plate during coupling of said shield and said grounding plate, and further define a tab vs. slit structure around a front portion of the connector so as to form a final engagement between the shield and the grounding plate during said coupling, wherein said shield and said grounding plate are not assembled to each other through a direct vertical coupling but via at least a vertical step plus a horizontal step of said coupling.

9. The connector as described in claim 4, wherein said tab vs. cutout structure includes an upwardly facing cutout and a right angle tab, respectively disposed on one and the other of said grounding plate and the shield.

* * * * *